(12) United States Patent
Abrams et al.

(10) Patent No.: US 8,165,927 B2
(45) Date of Patent: Apr. 24, 2012

(54) PURCHASING ITEMS IN A PROGRAM

(75) Inventors: Roger Kenneth Abrams, Raleigh, NC (US); Robert Thomas Cato, Raleigh, NC (US); Jeff David Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 11/953,644

(22) Filed: Dec. 10, 2007

(65) Prior Publication Data
US 2009/0150257 A1 Jun. 11, 2009

(51) Int. Cl.
*G06Q 30/00* (2012.01)
(52) U.S. Cl. ........................................... 705/27.1
(58) Field of Classification Search ............ 705/26, 705/27, 27.1
See application file for complete search history.

(56) References Cited

U.S. PATENT DOCUMENTS

| | | | |
|---|---|---|---|
| 6,615,408 B1 * | 9/2003 | Kaiser et al. | 725/112 |
| 6,804,357 B1 | 10/2004 | Ikonen et al. | |
| 7,110,714 B1 | 9/2006 | Kay et al. | |
| 2002/0133413 A1 | 9/2002 | Chang et al. | |
| 2003/0066091 A1 | 4/2003 | Lord et al. | |
| 2004/0122746 A1 * | 6/2004 | Charlier et al. | 705/27 |
| 2005/0132420 A1 | 6/2005 | Howard et al. | |
| 2006/0015405 A1 * | 1/2006 | Bala et al. | 705/14 |
| 2007/0039020 A1 | 2/2007 | Cansler, Jr. et al. | |
| 2008/0249865 A1 * | 10/2008 | Angell et al. | 705/14 |

OTHER PUBLICATIONS

Kimberly S. Johnson Denver Post Staff Writer, "Dish users push button to shop HSN EchoStar has teamed up to develop an interactive method of purchasing items on TV by using only the remote control," Denver Post, May 29, 2007, p. C.1.*

* cited by examiner

*Primary Examiner* — Jeffrey A Smith
*Assistant Examiner* — Brandy A Zukanovich
(74) *Attorney, Agent, or Firm* — Yee & Associates, P.C.; Tom Tyson

(57) ABSTRACT

Processing purchasing items is provided. A broadcast television signal is received at a television system. The broadcast television signal contains data indicating that an item in the broadcast television signal is being offered for sale. A visual cue is presented in association with the item being presented in the television system in response to receiving the data. In response to receiving a user input to purchase the item, a purchase request process is sent to a seller of the item to purchase the item using personal information needed to purchase the item stored in the television system.

20 Claims, 8 Drawing Sheets

PURCHASING ITEMS IN A PROGRAM

BACKGROUND OF THE INVENTION

1. Field of the Invention

The present disclosure relates generally to an improved data processing system and in particular to a method and apparatus for processing requests. Still more particularly, the present disclosure relates to a computer implemented method, apparatus, and computer usable program code for processing television sales requests.

2. Description of the Related Art

Televisions have become a common household communications device in homes and other institutions. The television has become a source of entertainment and news. Additionally, the television is used as a means to communicate advertising on a wide-scale basis. Television programming involves broadcasting a broadcast television signal that is presented on a television system. The broadcast television signal also is referred to as a program or a television transmission signal. The broadcast television signal may be analog or digital in form. Further, this signal may be distributed over various types of medium in a communication system.

Different programs watched by users are often shown in segments in which commercials are presented in between different segments. Further, some programming provided to users themselves are commercials. These types of commercials are referred to as infomercials. An infomercial is a television commercial that runs as long as a typical television program. Infomercials also are referred to as paid programming or teleshopping. Infomercials are designed to solicit a direct response which is specific and quantifiable.

Currently, users who see items that they desire to purchase from an infomercial or other commercial presented on a television may purchase items by contacting the seller. The infomercials and commercials typically provide the viewer with a telephone number or a universal resource locator to a web site that the user may use to purchase a particular item. This type of process, however, requires the user to make the phone call, find their credit card, supply an operator with their name, address, credit card number, and perform other actions to purchase a particular item. This type of process may be inconvenient for a buyer.

For example, a buyer may be unable to find their credit card number or the buyer may miss the phone number presented on the commercial for an item that they wish to purchase. Also, this type of process is error prone. For example, an operator taking information for the purchase of an item may enter information incorrectly. The use of operators also is costly for a seller offering an item for sale.

If the user initiates the purchase process through a web site, the user enters the universal resource locator, finds and selects the item they wish to purchase, enters a name, address, credit card number, and other information to purchase the item. This type of purchasing process reduces the time and costs because operators are not involved. Purchasing items from a web site, however, still requires additional time from the user and still may be error prone. The user may enter incorrect information into the forms retrieved from the web site when selecting an item for purchase.

Therefore, it would be advantageous to have a computer implemented method, apparatus, and computer usable program code for minimizing some or all of the problems described above as well as other possible problems involved in purchasing items advertised on a television.

SUMMARY OF THE INVENTION

The illustrative embodiments provide a computer implemented method, apparatus, and computer usable program code for processing purchasing items. A broadcast television signal is received at a television system. The broadcast television signal contains data indicating that an item in the broadcast television signal is being offered for sale. A visual cue is presented in association with the item being presented in the television system in response to receiving the data. In response to receiving a user input to purchase the item, a purchase request process is sent to a seller of the item to purchase the item using personal information needed to purchase the item stored in the television system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
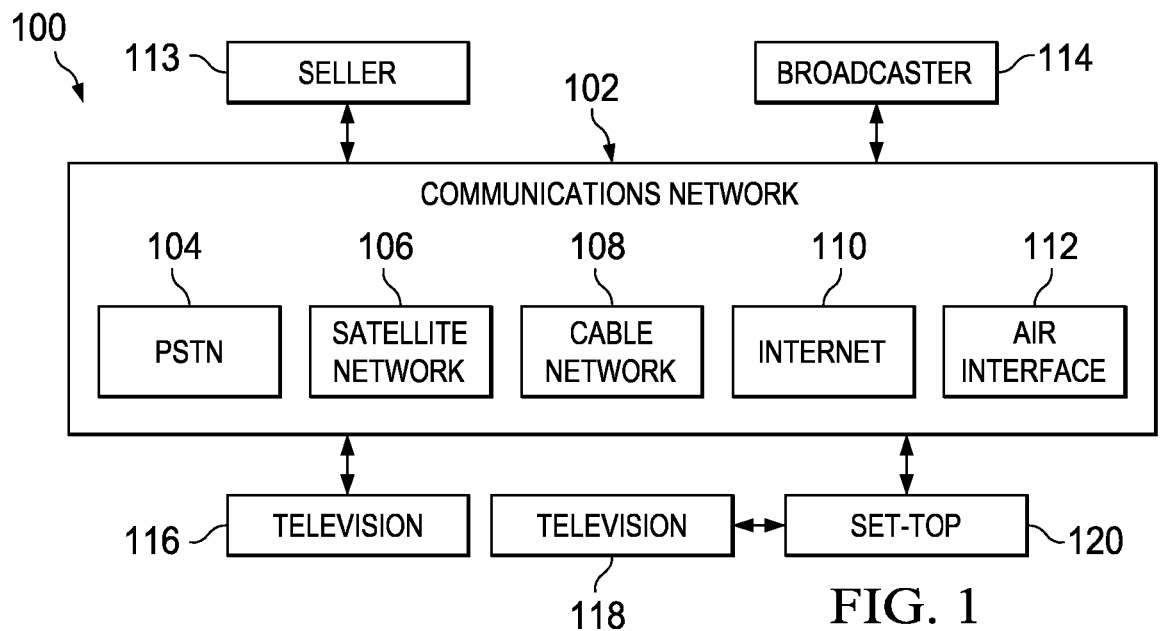
FIG. 1 is a block diagram of a communication system in which illustrative embodiments may be implemented.
Figure 2:
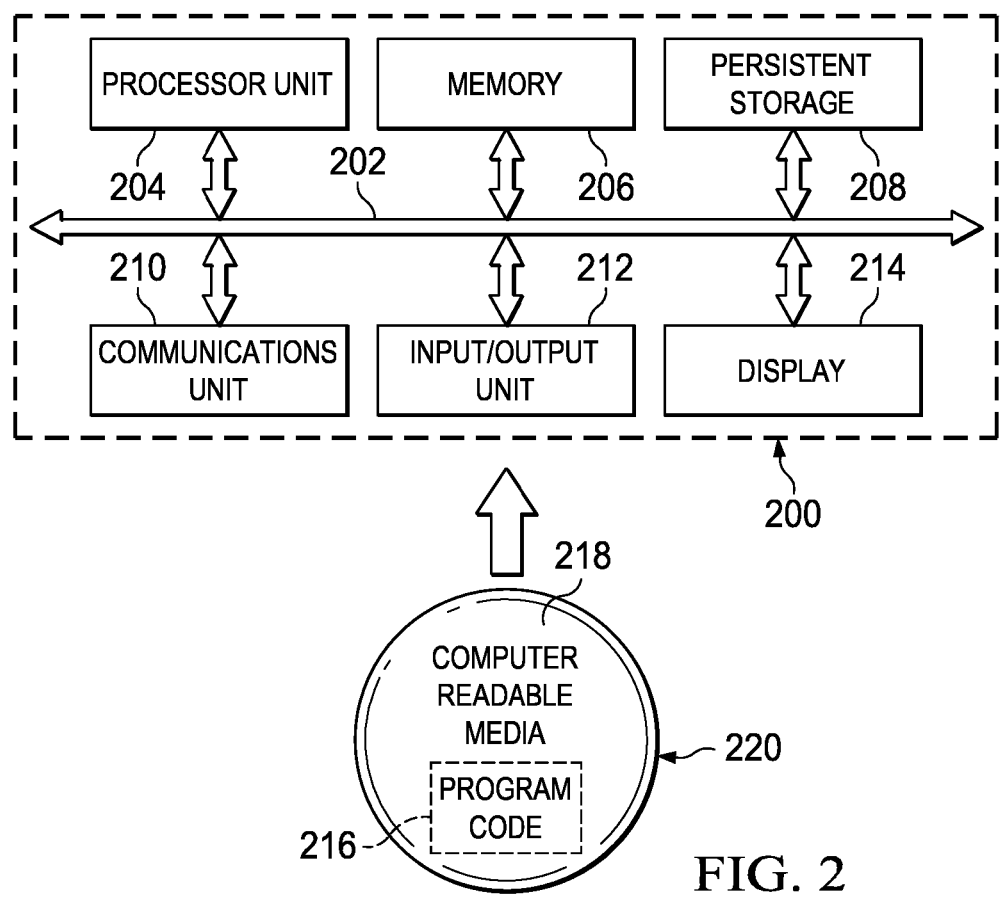
FIG. 2 is a diagram of a data processing system in accordance with an illustrative embodiment.

With reference now to the figures and in particular with reference to FIGS. 1-2, exemplary diagrams of data processing environments are provided in which illustrative embodiments may be implemented. It will be appreciated that FIGS. 1-2 are only exemplary and are not intended to assert or imply any limitation with respect to the environments in which different embodiments may be implemented. Many modifications to the depicted embodiments may be made.

FIG. 1 is a block diagram of a communication system in which illustrative embodiments may be implemented. Communication system 100 contains communications network 102 which is the medium used to provide communications links between various devices, televisions, and computers connected together within communications system 100. Communications network 102 may include various media to provide the communications links.

In these examples, a communications link may be, for example, a link between two devices to allow a transmission of data. This communications link may be, for example, a broadcasting of a broadcast television signal from one device to another device within communications network 102. In these examples, communications network 102 may include, for example, public switched telephone network (PSTN) 104, satellite network 106, cable network 108, Internet 110 and air interface 112. The different media for the networks within communications network 102 may include, for example, physical media, such as wire, fiber optic cables, and air. The use of air as a media may include the transmission of signals through satellite links and radio frequency transmissions.

Public switched telephone network 104 provides a medium for voice communications as well as to transmit programming. For example, programming may be transmitted over a digital subscriber line (DSL) connection within public switched telephone network 104. Satellite network 106 provides another medium for transmitting programming. Programming may be transmitted from broadcaster 114 to television 116 through satellite signals. With this type of implementation, a satellite dish is located at the location of television 116 or television 118 to receive the satellite signals from broadcaster 114.

Cable network 108 provides yet another medium for transmitting programming from broadcaster 114 to users at televisions 116 and 118. Cable network 108 includes physical wires for electrical cables in the form of coaxial cables. Internet 110 is a collection of networks using a transmission protocol such as Transmission Control Protocol/Internet Protocol (TCP/IP) to provide communications. This type of medium also may be used to transmit programming to users of communications network 102. Air interface 112 is yet another medium that may be used within communications network 102 to transmit programming to users. Air interface 112 provides for the propagation of radio frequency signals containing the programming.

Broadcaster 114 is an example of a source of programming that may be transmitted to devices, such as television 116 and television 118 through set-top 120. Broadcaster 114 transmits programming to television 116 and television 118 for viewing by users. This programming includes, for example, shows, movies, and commercials.

Seller 113 is a seller of items that may be advertised within programming transmitted by broadcaster 114. A user wishing to purchase an item offered by the seller may contact the seller through different means. For example, calls may be made through public switched telephone network 104 or inquiries or requests for purchases may be made through Internet 110. Seller 113 may be, for example, a company or other organization that offers items for sale.

Set-top 120 is a device that connects television 118 and an external source of a broadcast television signal. Set-top 120 provides tuning and/or decoding of a broadcast television signal into content that may be displayed on television 118. Set-top 120 may process broadcast television signals originating from various sources, such as public switched telephone network 104, satellite network 106, cable network 108, Internet 110, and air interface 112. In some embodiments, the functions of set-top 120 may be integrated or implemented within the television itself, such as television 116.

A user at a television, such as television 116 may see a commercial in a program transmitted by broadcaster 114 for an item that is for sale by seller 113. The user may contact seller 113 by placing a telephone call through communications network 102. Alternatively, the user may contact seller 113 through the World Wide Web by entering the universal resource locator presented within a commercial. The different illustrative embodiments provide a user an ability to reduce the number of steps needed to purchase items offered for sale through communications network 102. In the different illustrative embodiments, the television system provides interaction with the user in a manner that reduces the number of steps needed to place an order with seller 113 when a user decides to purchase an item. In these examples, a television system may be, for example, television 116 or set-top 120 and television 118.

Communications system 100 in FIG. 1 is intended as an example and not an architectural limitation for the different illustrative embodiments. For example, other broadcasters and sellers may be present within communications system 100 other than broadcaster 114 and seller 113. In addition, television 116 and television 118 may be traditional televisions found in a household or other establishment. In other embodiments, television 116 and television 118 may take other forms, such as a computer, mobile phone, or some other device that is able to receive programming sent by broadcaster 114.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type. In yet other embodiments, processor unit 204 may be a controller or application specific integrated chip that performs some number of functions. In this type of embodiment, processor unit 204 may not execute instructions for software loaded into memory. Instead, these instructions may be embedded in the logic of processor unit 204.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. When data processing system 200 is implemented as a set-top, persistent storage 208 may store information, such as listing data identifying channels and programs that are broadcast at different times on different channels. Further, persistent storage 208 also may include a hard disk drive for storing programs when the set-top includes digital video recorder functions.

Communications unit 210, in these examples, provides for communications with other data processing systems or devices. In these examples, communications unit 210 may be a network interface card. Communications unit 210 also may be a television tuner or decoder when data processing system 200 is implemented as a set-top. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user. In these examples, display 214 is an adapter or output that sends signals for display on a monitor or television.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Data processing system 200 is an example of a computer that may be located at a seller or broadcaster, such as seller 113 and broadcaster 114 in FIG. 1. Additionally, data processing system 200 provides an example of components that may be found in a set-top, such as set-top 120 or integrated within a television, such as television 116. With this type of implementation, communications unit 210 receives broadcast television signals and decodes those signals for display on a television. The decoded signals may be transmitted for display on the television through display 214. Further, processes for facilitating the purchase of items offered for sale over broadcast television signals may be implemented within data processing system 200.

The different illustrative embodiments provide a computer implemented method, apparatus, and computer program code for processing purchase requests in a television system. A broadcast television signal is received at a television system. This broadcast television signal contains data indicating that an item in the broadcast television signal is being offered for sale. A visual cue is presented in association with the item being presented in the television system in response to receiving the information. In response to receiving the user input to purchase the item, a purchase request process is performed for the item using personal information needed to purchase the items stored in the television system.

In these illustrative embodiments, the broadcast television signal is a signal containing the programming. This programming may be, for example, a show, a movie, or a commercial. The broadcast television signal also may include programming information, such as channel, time, and program identifications for programs that are being broadcast or will be broadcast. For example, a broadcast television signal also may contain data informing the television system that an item is being offered for sale. This visual cue or some other suitable user input device may be displayed to a user who may then use a remote control to purchase the item. In the different illustrative embodiments, the television system may directly place the order with the seller without requiring the user to contact an operator or web site of the seller. In the different illustrative embodiments, the user may perform all of the interactions through the television system to purchase an item that is being offered for sale. In the different illustrative embodiments, the item does not include programming provided by the broadcaster. Instead, the different items for which purchases are made are for items offered by a seller other than the broadcaster. These items may be, for example, goods or services.

Figure 3:
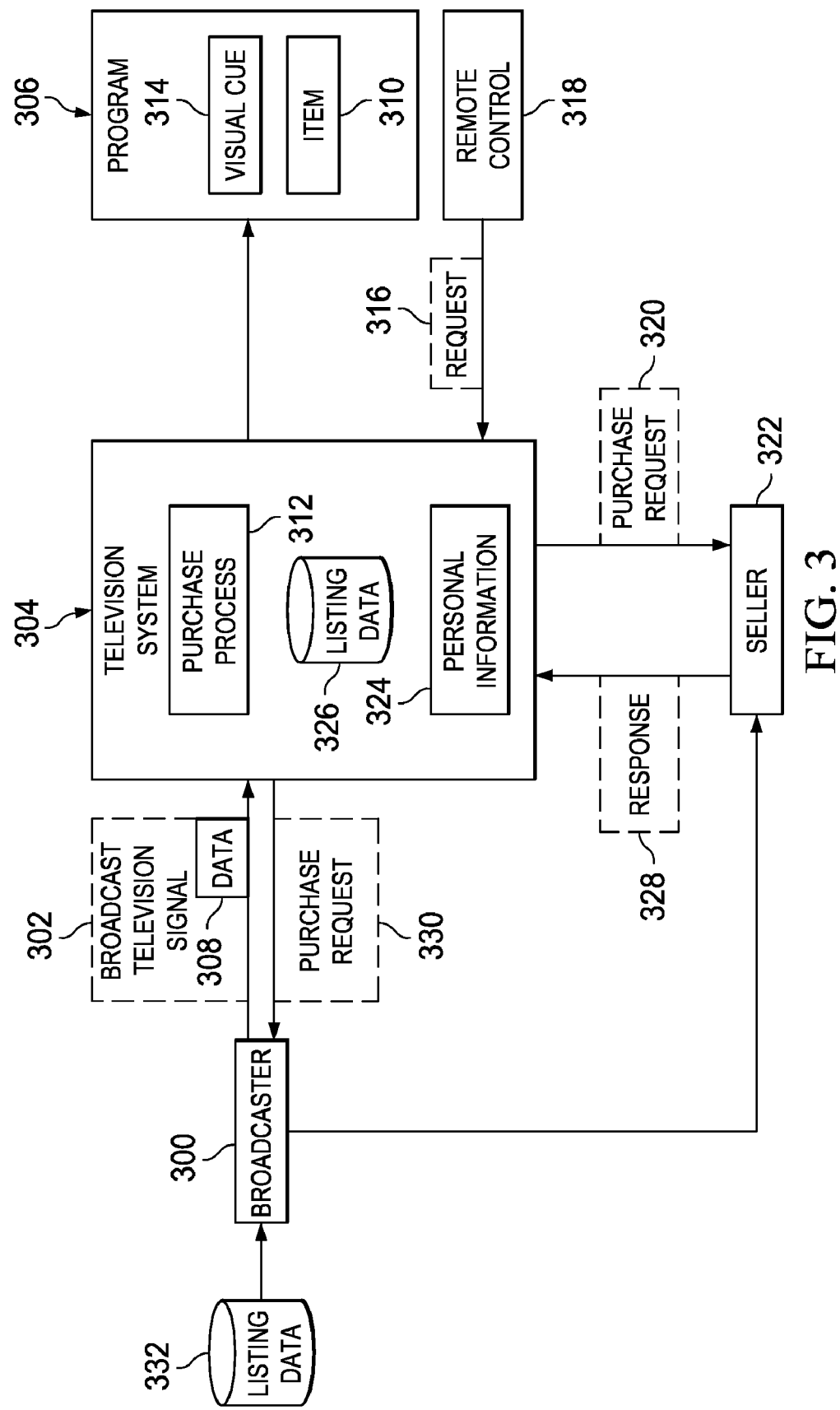
FIG. 3 is a block diagram illustrating components used in purchasing items in accordance with an illustrative embodiment.

Turning now to FIG. 3, a block diagram illustrating components used in purchasing items is depicted in accordance with an illustrative embodiment. In this example, broadcaster 300 may transmit broadcast television signal 302 to television system 304 for display to a user. Broadcaster 300 may be, for example, broadcaster 114 in FIG. 1. Broadcast television signal 302 may be transmitted over a medium, such as communications network 102 in FIG. 1.

Television system 304 may be, for example, television 116 in FIG. 1. In other embodiments, television system 304 may include television 118 and set-top 120 in FIG. 1. Television system 304 may take various forms. For example, television system 304 may be a television unit whose primary function is to display programs. In other embodiments, television system 304 may have multiple functions, such as, for example, a computer that receives and displays broadcast television signal 302. In yet other embodiments, television system 304 may be a mobile phone or other mobile device capable of presenting broadcast television signal 302.

In this illustrative example, broadcast television signal 302 results in the presentation of program 306 on television system 304. Broadcast television signal 302 includes data 308, which indicates that item 310 in program 306 is being offered for sale. Purchase process 312 identifies data 308 and generates a presentation of visual cue 314 in the presentation of program 306 to indicate that item 310 is being offered for sale.

Data 308 may take various forms. For example, data 308 may be merely a flag indicating that an item is being offered for sale. With this type of data in data 308, no identification of the item, its purchase price, or any other information is provided within data 308. In other embodiments, data 308 may include other information, such as an identification of the item and a price.

Visual cue 314 also may take various forms. For example, visual cue 314 may be merely a graphic or icon that is presented within program 306 to indicate that item 310 is being offered for sale. In other illustrative examples, visual cue 314 may actually highlight or graphically alter the presentation of item 310 within program 306 to draw attention to that item as being an item for sale.

When item 310 is no longer being presented in program 306, data 308 may indicate an absence of items being offered for sale or merely be absent from broadcast television signal 302 in these examples.

In these illustrative examples, a user of television system 304 may generate request 316 through remote control 318. In response to receiving request 316, purchase process 312 generates and sends purchase request 320 to seller 322 to purchase item 310. Purchase process 312 includes personal information 324 within purchase request 320. This personal information includes information needed to purchase item 310.

Purchase request 320 is generated without requiring the user to call or otherwise contact seller 322 through other components or devices. In other words, the user wishing to purchase item 310 does not have to perform additional steps using other software and/or hardware devices, such as a browser on a computer or a telephone. Further, the user also does not have to perform multiple interactions by establishing a communications link or connection to seller 322. The processing of the request is handled within television system 304 in these examples. All confirmations of whether the user desires to purchase item 310 are performed by purchase process 312 prior to sending purchase request 320 to seller 322.

The identification of seller 322 may be made from data 308 within broadcast television signal 302. In other embodiments, other mechanisms may be used to identify seller 322. For example, listing data 326 may be used to identify the particular seller. Listing data 326 may identify sellers based on time and channel directory listing data. Listing data 326 also may include an identification of the seller for particular items that are being offered for sale during different programs that are to be presented on different channels at different times.

When seller 322 receives purchase request 320, seller 322 may immediately respond with additional information for display to the user. In this example, response 328 may include an anticipated ship date, a total with tax and shipping, and other suitable information. Seller 322 also may include other marketing incentives within response 328. For example, an opportunity to buy additional items or other items with no additional shipping costs may be offered within response 328, providing the user of television system 304 to accept or decline the offer.

In other illustrative embodiments, purchase process 312 may generate purchase request 330 and send purchase request 330 to broadcaster 300. With this type of embodiment, purchase process 312 does not need to have any information about seller 322 and is not required to perform any processing to identify seller 322. Instead, broadcaster 300 identifies seller 322 based on purchase request 330.

With this example, a time stamp identifying the time at which purchase request 330 was made may be used to identify the seller. The identification may be made using listing data 332. Listing data 332 is an identification of programming that occurs on different channels at different times. Additionally, listing data 332 also may include an identification of sellers of items being offered for sale during the different programs at different times. In this manner, broadcaster 300 may redirect purchase request 330 to seller 322 to purchase an item.

Data 308 and listing data 332 may include the information needed by purchase process 312 to send purchase request 320 to seller 322. This information may include, for example, a telephone number for transmitting purchase request 320 to a computer at seller 322 or a universal resource locator to a computer at seller 322 to purchase item 310.

Further, purchase process 312 also may require authentication by the user before purchase request 320 is sent to seller 322. For example, the user may be required to enter a password through remote control 318 to authenticate the sale. Further, personal information 324 may be personal information for multiple users, allowing multiple users of television system 304 to make purchases of items, such as item 310.

Purchase process 312 also may perform other actions depending on the particular implementation. For example, purchase process 312 may request quantity information for a sale. As an example, purchase process 312 may display a dialog box for a user to enter a quantity of the number of items being purchased. Also, purchase process 312 also may display a final request for authorization before making the sale. For example, a "are you sure" message may be displayed to prevent accidental orders.

Thus, the different illustrative embodiments puts data 308 into broadcast television signal 302 such that television system 304 can determine when an item, such as item 310, is being offered for sale in display visual cue 314 to the user. The user may then generate a request to purchase item 310. As a result, when request 316 is made, purchase process 312 generates purchase request 320 to include the necessary information to purchase the item without requiring the user to contact seller 322. By having this information generated and placed into purchase request 320 without the user having to contact seller 322 to initiate an order, a significant source of errors in the ordering process are reduced or eliminated.

Instead, the different illustrative embodiments involve the user performing different steps to buy an item without having to contact seller 322 to provide the personal information needed to purchase an item. Information, such as, for example, name, billing address, shipping address, credit card number, telephone number, email address, and other suitable information needed to purchase an item are stored in personal information 324 in television system 304. The user may enter this information once and use personal information 324 repeatedly to purchase items presented in program 306 when visual cue 314 is presented.

With this type of process, a user is not required to enter information into a web page or to give that information to an operator over the telephone. In other words, the time and effort needed to call an operator is avoided along with any errors that may occur. As another example, the user does not have to use a computer to go to a website for seller 322, find the item, select to purchase the item, fill in forms to purchase the item, and confirm the purchase. The time for these steps as well as errors that may occur with user input are avoided.

Thus, the amount of time needed to purchase an item is reduced. Purchase process 312 interacts with the user as appropriate and then places the order with seller 322. In this manner, a purchase process for buying an item occurs in a convenient manner for the user. Further, this type of purchase process is inexpensive to a company as compared to having human operators handle calls to purchase items. Further, the amount of errors that may occur are reduced in these examples.

Figure 4:
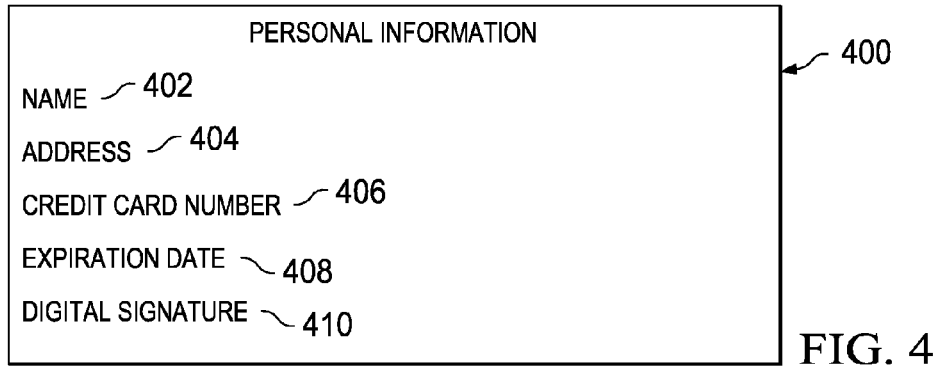
FIG. 4 is a diagram illustrating personal information in accordance with an illustrative embodiment.

Turning now to FIG. 4, a diagram illustrating personal information is depicted in accordance with an illustrative embodiment. In this example, personal information 400 is an example of personal information 324 in FIG. 3. Personal information 400 in these examples includes name 402, address 404, credit card number 406, expiration date 408, and digital signature 410.

Name 402, address 404, credit card number 406, and expiration date 408 is an example of information needed to complete a sale for an item. Digital signature 410 may be used to confirm that the request actually originated from a particular user. Of course, any other suitable information in addition to or in place of the information illustrated in personal information 400 may be used in other embodiments.

Figure 5:
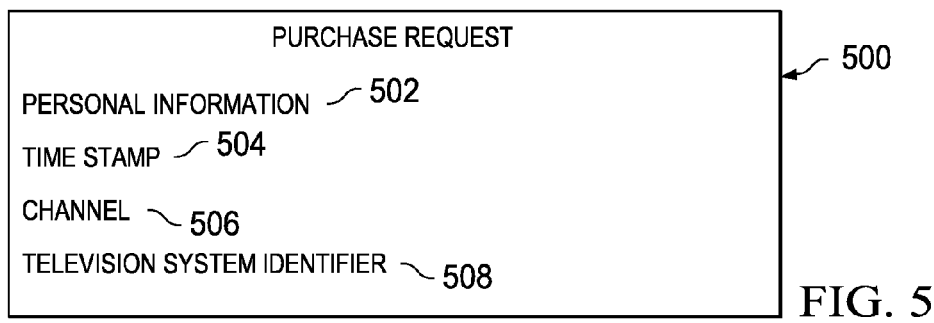
FIG. 5 is a diagram illustrating a purchase request in accordance with an illustrative embodiment.

With reference now to FIG. 5, a diagram illustrating a purchase request is depicted in accordance with an illustrative embodiment. In this example, purchase request 500 includes personal information 502, time stamp 504, channel 506, and television system identifier 508.

Personal information 502 contains information needed to purchase the item that is for sale. Personal information 502 may be, for example, personal information 400 in FIG. 4. Time stamp 504 is a date and time of when the purchase request is initiated by the user. Channel 506 identifies the channel being displayed on the television when the purchase request was made. Television system identifier 508 identifies the particular television system from which the request was generated. This television system identifier may be a serial number or other unique identifier for the television or a set-top within the television system.

Time stamp 504 and channel 506 in purchase request 500 may be used to identify the particular item being offered for sale when the request was made. As a result, the television system does not have to have any information about the item being sold. This identification may be used by the seller directly. In other implementations, the broadcaster may identify the item being offered for sale and relay that information to the seller.

Television system identifier 508 provides an additional piece of information to verify that a particular user is actually making a purchase. Of course, purchase request 500 may include other information in addition to or in place of information illustrated in this particular example.

Figure 6:
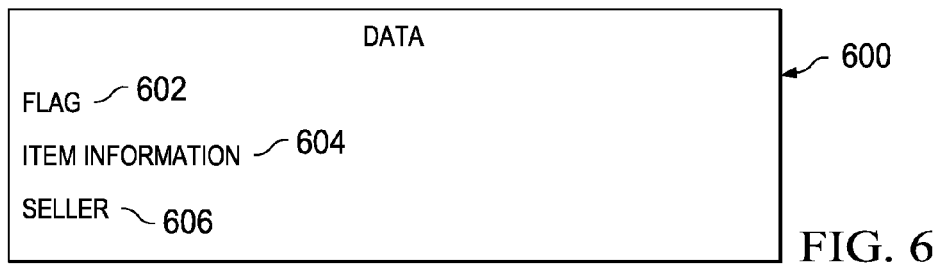
FIG. 6 is a diagram of data in a broadcast television signal in accordance with an illustrative embodiment.

Turning now to FIG. 6, a diagram of data in a broadcast television signal is depicted in accordance with an illustrative embodiment. Data 600 is an example of data 308 in FIG. 3. Data 600 includes flag 602, item information 604, and seller 606.

Flag 602 may be used to determine whether a visual cue should be presented on a television system. Item information 604 is optional information that may be used to provide additional information about the item for processing purchase requests. Seller 606 identifies the seller of the item and may be optional, depending on the particular implementation. Seller 606 may take the form, for example, without limitation, an email address, a telephone number to a modem for a computer of the seller, or a universal resource locator for transmitting purchase requests.

Figure 7:
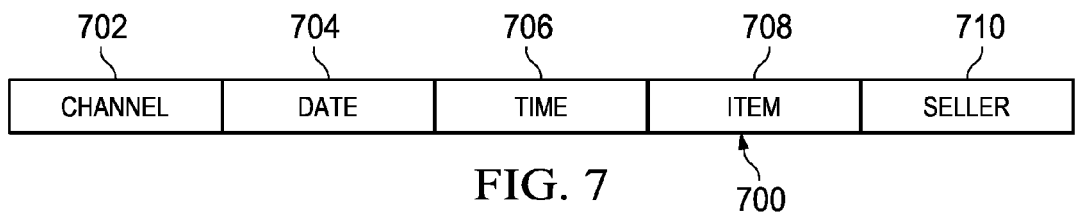
FIG. 7 is a diagram illustrating an entry in listing data in accordance with an illustrative embodiment.

Turning now to FIG. 7, a diagram illustrating an entry in listing data is depicted in accordance with an illustrative embodiment. In this example, entry 700 is an example of an entry in listing data 326 or listing data 332 in FIG. 3. Entry 700 includes channel 702, date 704, time 706, item 708, and seller 710. By identifying a time stamp in a channel in a purchase request, this information may be used to identify a particular item and seller, such as item 708 and seller 710 by corresponding this information to channel 702, date 704, and time 706. This type of information allows for an item to be identified in a purchase request without requiring the television system to know what items are being purchased.

Figure 8:
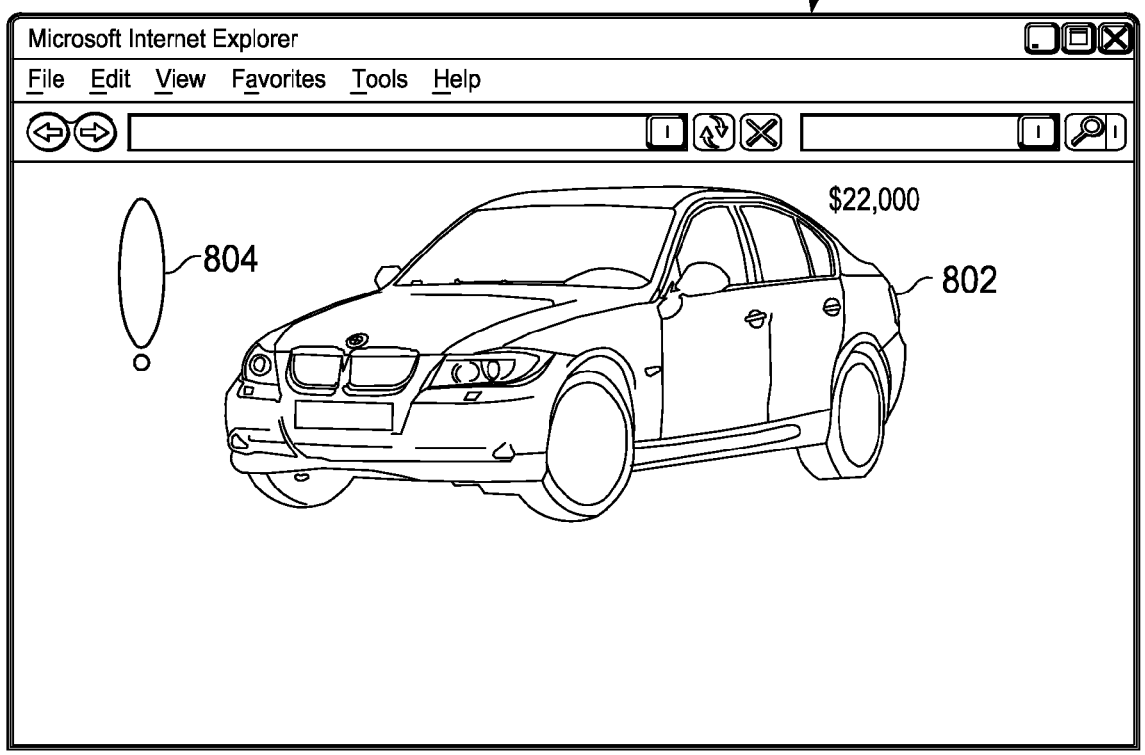
FIG. 8 is an illustration of a program with an item for sale in accordance with an illustrative embodiment.

Turning now to FIG. 8, an illustration of a program with an item for sale is depicted in accordance with an illustrative embodiment. In this example, display 800 is a display of a program, such as program 306 in FIG. 3. Automobile 802 is an example of an item, such as item 310 in FIG. 3 that is being offered for sale in display 800. Items may be goods and/or services. Graphical indicator 804 is an example of a visual cue, such as visual cue 314 in FIG. 3. Graphical indicator 804 provides a visual cue to a user of a television system that automobile 802 is being offered for sale.

Figure 9:
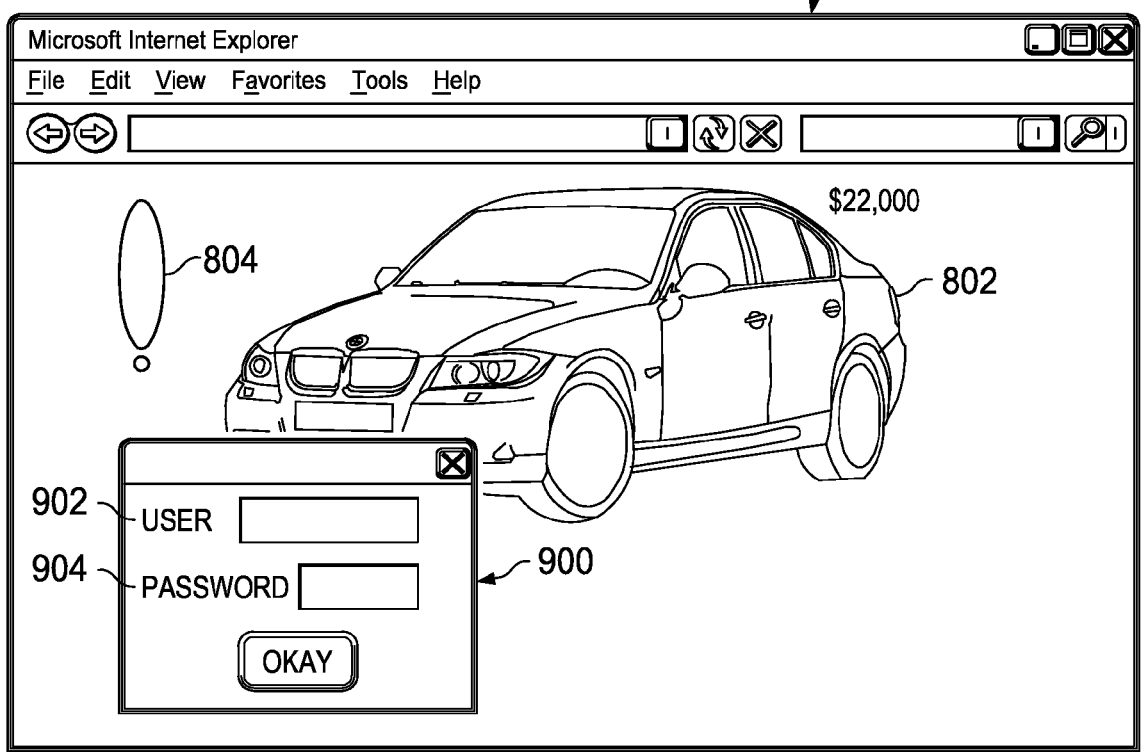
FIG. 9 is a diagram illustrating a request to authenticate a sale of an item in accordance with an illustrative embodiment.

Turning now to FIG. 9, a diagram illustrating a request to authenticate a sale of an item is depicted in accordance with an illustrative embodiment. In this example, dialog box 900 is presented to the user on display 800 after the user has indicated that the user would like to purchase automobile 802.

In this example, dialog box 900 requests that a user enter user identifier 902 and password 904. This information may be entered through a remote control, such as remote control 318 in FIG. 3.

Figure 10:
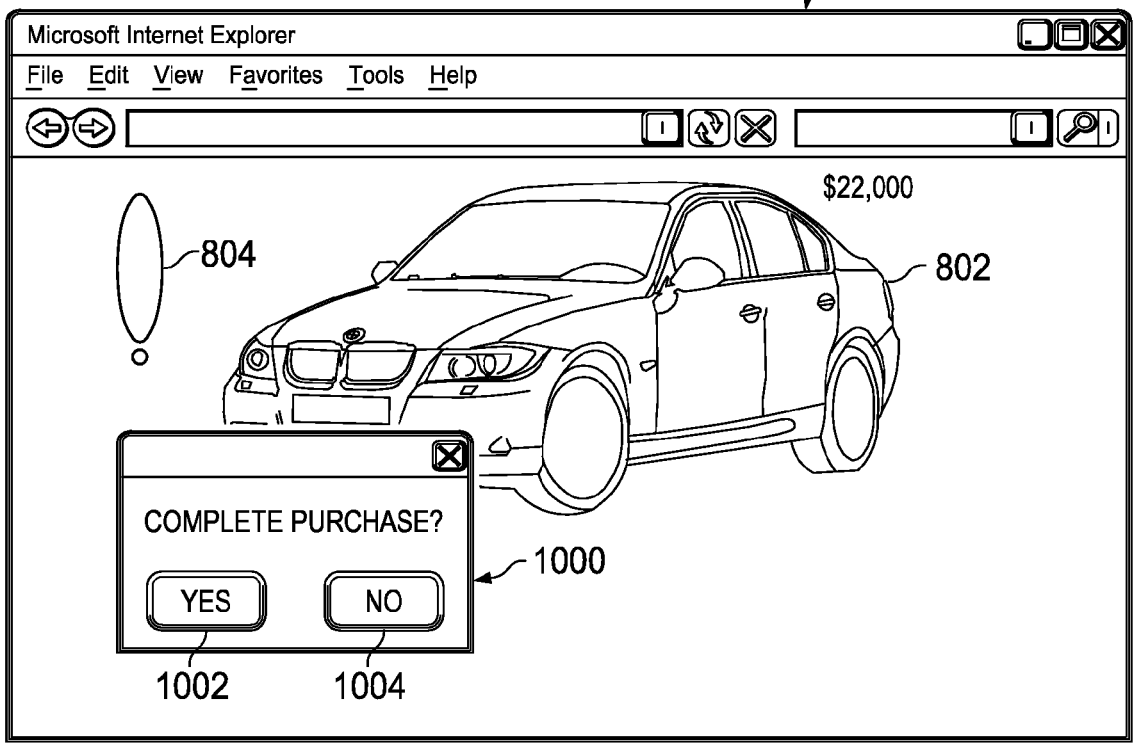
FIG. 10 is a diagram illustrating a confirmation of a purchase in accordance with an illustrative embodiment.

Turning now to FIG. 10, a diagram illustrating a confirmation of a purchase is depicted in accordance with an illustrative embodiment. In this example, dialog box 1000 is presented to the user on display 800 to ensure that the user actually wants to purchase automobile 802. Dialog box 1000 asks whether the user desires to complete the purchase. "Yes" button 1002 may be selected by the user through a remote control to complete the purchase and "no" button 1004 may be selected by the user to cancel the purchase. This type of confirmation helps ensure that accidental orders do not occur.

Figure 11:
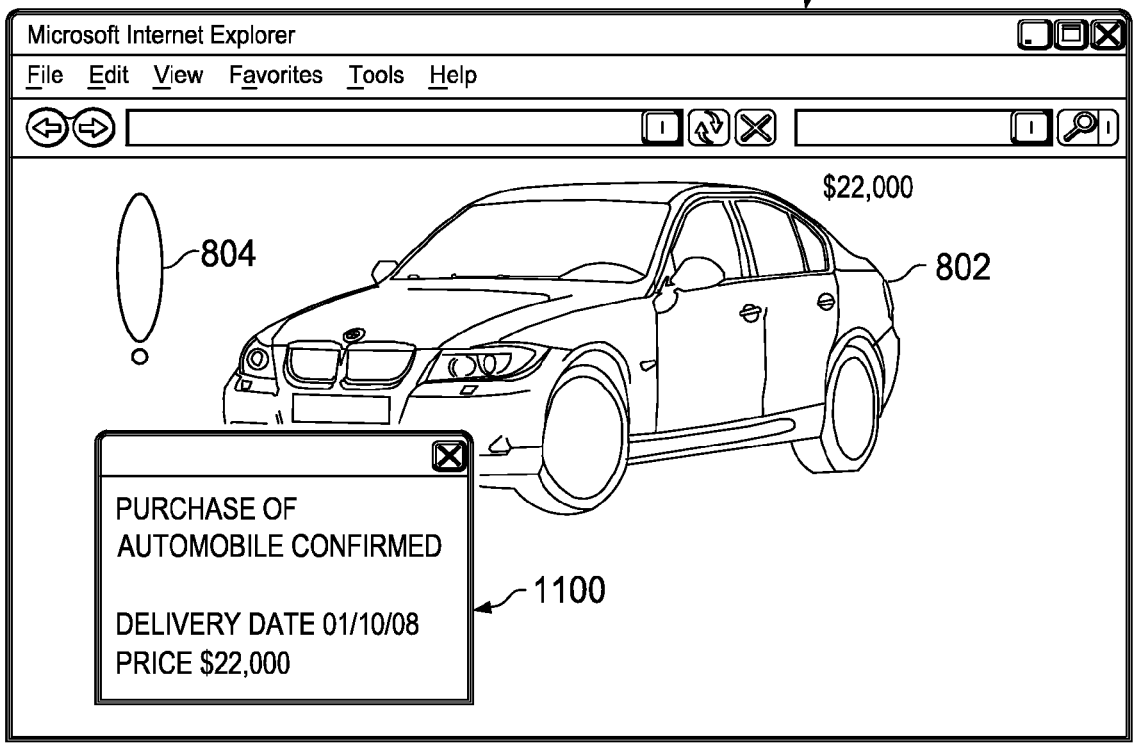
FIG. 11 is a diagram illustrating a confirmation of a sale for an item in accordance with an illustrative embodiment.

Turning now to FIG. 11, a diagram illustrating a confirmation of a sale for an item is depicted in accordance with an illustrative embodiment. In this example, dialog box 1100 is displayed within display 800 to confirm the purchase of automobile 802 as well as providing a delivery date and the price paid. This confirmation is received by the television system from the seller. This confirmation is an optional one. In some embodiments, a confirmation may be sent by other means, such as email or postal mail.

Figure 12:
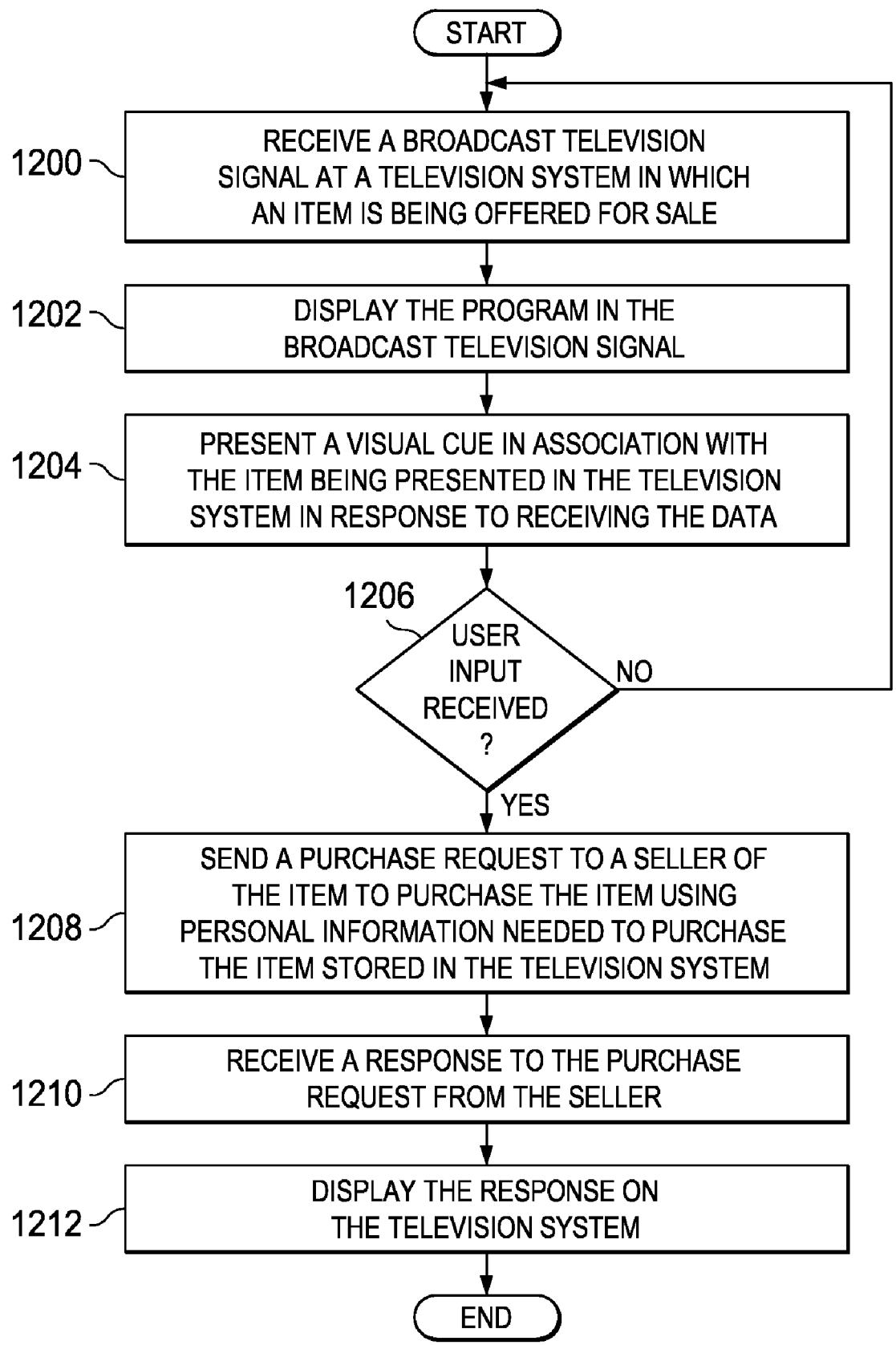
FIG. 12 is a flowchart of a process for purchasing items in accordance with an illustrative embodiment.

Turning now to FIG. 12, a flowchart of a process for purchasing items is depicted in accordance with an illustrative embodiment. The process illustrated in FIG. 12 may be implemented in a television system, such as television system 304 in FIG. 3. More specifically, the process illustrated in FIG. 12 may be implemented as part of purchase process 312 in FIG. 3.

The process begins by receiving a broadcast television signal at a television system in which an item is being offered for sale (step 1200). In these examples, the broadcast television signal may also include data indicating that the item is being offered for sale. The process then displays the program in the broadcast television signal (step 1202). This display of the program also includes the item that is being offered for sale. The item being displayed is part of the programming and is not any information added by the process. The process presents a visual cue in association with the item being presented in the television system in response to receiving the data (step 1204).

A determination is then made as to whether a user input is received in the television system to purchase the item (step 1206). If a user input is not received, the process returns to step 1200 as described above. Otherwise, the process sends a purchase request to a seller of the item to purchase the item using personal information needed to purchase the item stored in the television system in response to receiving a user input to purchase the item (step 1208). The process then receives a response to the purchase request from the seller (step 1210). The process then displays the response on the television system (step 1212) with the process terminating thereafter.

The purchase request sent in step 1208 may be performed in a number of different ways. For example, the purchase request may be sent by establishing a connection or session with a computer for the seller and sending the purchase information over the connection. In other examples, the purchase information may be sent as part of an email message to an address for the seller.

Figure 13:
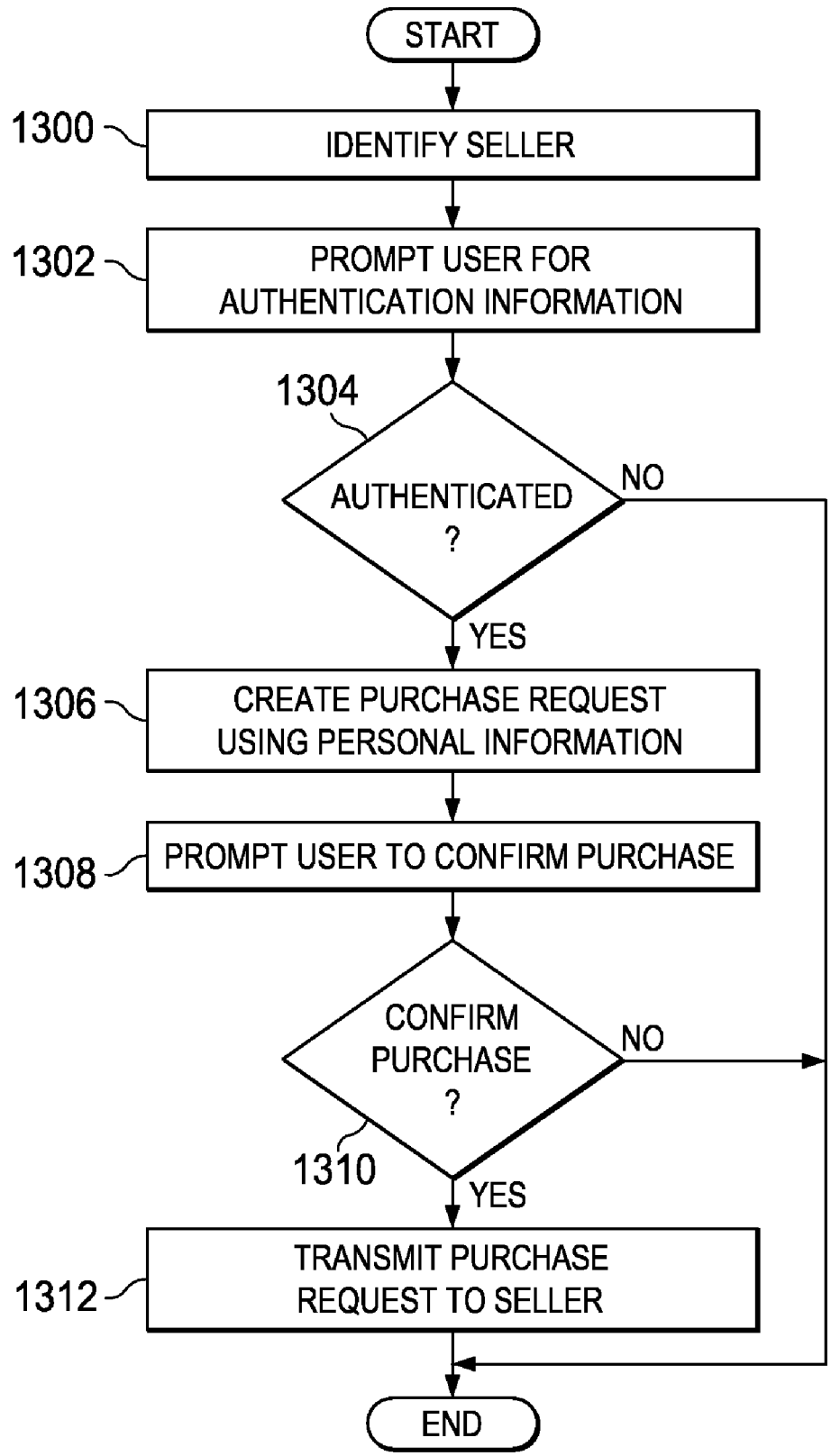
FIG. 13 is a flowchart of a process for sending a purchase request to a seller of an item in accordance with an illustrative embodiment.

Turning now to FIG. 13, a flowchart of a process for sending a purchase request to a seller of an item is depicted in accordance with an illustrative embodiment. The process illustrated in FIG. 13 is a more detailed illustration of one embodiment of step 1208 in FIG. 12.

The process begins by identifying the seller (step 1300). The seller may be identified through information sent as part of the broadcast television signal, such as data 308 in FIG. 3. In other embodiments, the seller may be identified through using listing data, such as listing data 326 in FIG. 3. The identification of the seller in these examples includes contact information for the seller. This contact information may be, for example, a telephone number to a modem for a computer operated by a seller, an email address, or a web page for receiving purchase requests for the item.

The process then prompts the user for authentication information (step 1302). This prompting for authentication information may include, for example, requesting a user name and password. The prompt may take the form of a dialog box, such as dialog box 900 in FIG. 9.

A determination is then made as to whether the user is authenticated (step 1304). If the user is authenticated, a purchase request is created using the personal information for the user (step 1306). This purchase request may be, for example, purchase request 500 in FIG. 5. The process then prompts the user to confirm the purchase (step 1308). This confirmation may be performed by displaying a dialog box on the display, such as dialog box 1000 in FIG. 10.

Next, a determination is made as to whether the purchase has been confirmed by the user (step 1310). If the purchase has been confirmed by the user, the process transmits the purchase request to the seller (step 1312) with the process terminating thereafter. If, on the other hand, the user does not confirm the purchase, the process terminates. The process also terminates if the user is not authenticated in step 1304.

Figure 14:
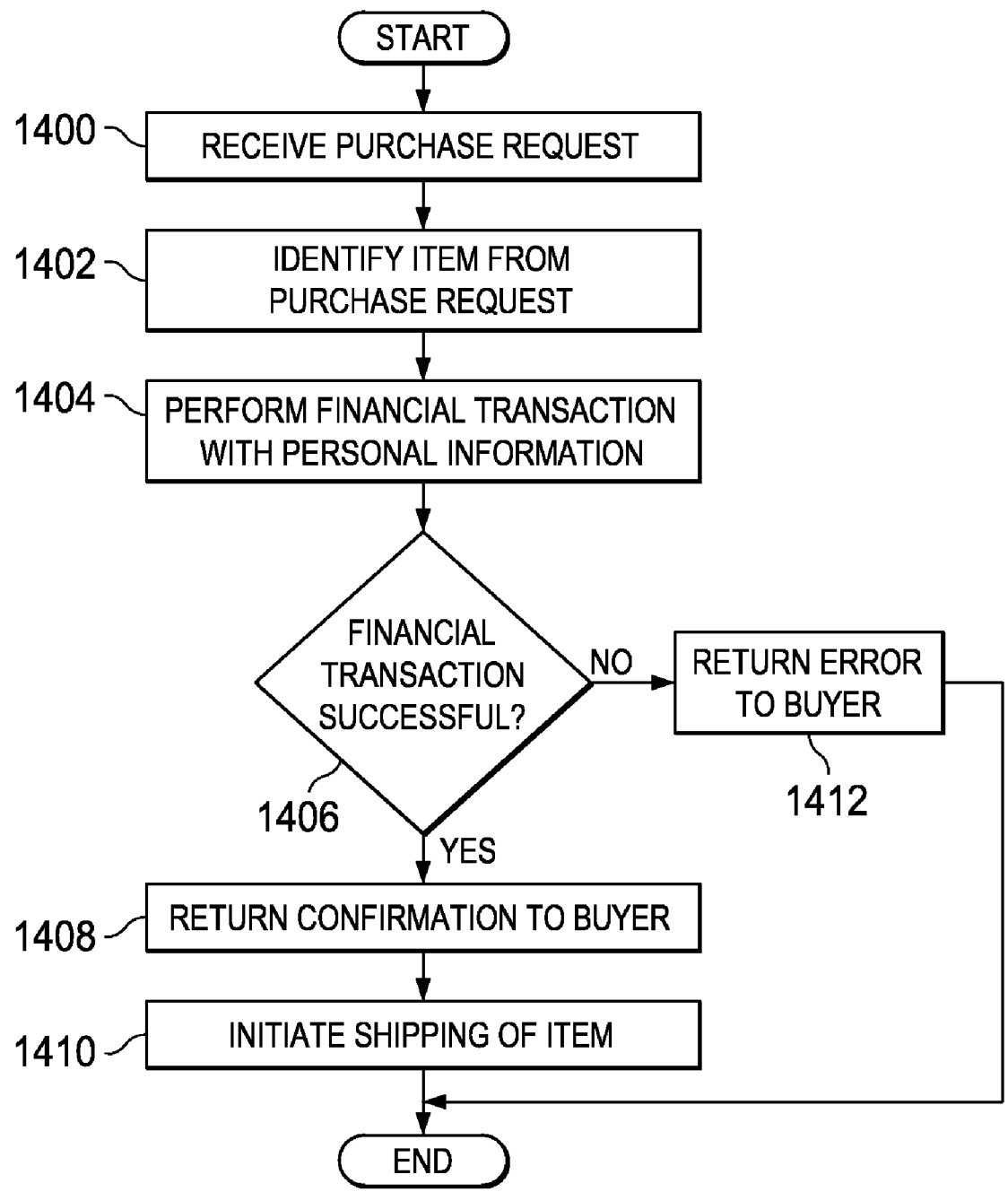
FIG. 14 is a flowchart of a process for processing a request in accordance with an illustrative embodiment.

Turning now to FIG. 14, a flowchart of a process for processing a request is depicted in accordance with an illustrative embodiment. The process illustrated in FIG. 14 may be implemented by a seller, such as seller 322 in a data processing system, such as data processing system 200 in FIG. 2.

The process begins when receiving a purchase request (step 1400). The process then identifies the item from the purchase request (step 1402). The process performs a financial transaction using the personal information (step 1404). This financial transaction, may be, for example, billing a credit card for the buyer based on the credit card number in the personal information. The financial transaction also may be to debit an account of a buyer, such as a checking account.

A determination is then made as to whether the financial transaction is successful (step 1406). If the financial transaction is successful, the confirmation is returned to the buyer (step 1408). The process then initiates shipping of the item (step 1410) with the process terminating thereafter. With reference again to step 1406, if the financial transaction is not successful, the process then returns an error to the buyer (step 1412) with the process terminating thereafter.

Thus, the different advantageous embodiments provide a computer implemented method, apparatus, and computer usable program code for purchasing items presented in a program. In the different embodiments, a broadcast television signal is received at a television system. The broadcast television signal contains data indicating that an item in the broadcast television signal is being offered for sale. A visual cue is presented in association with the item being presented in the television signal in response to receiving the data. Responsive to receiving the user input to purchase the item, a purchase request is sent to a seller of the item to purchase the item using personal information stored in the television system. This personal information is information needed to purchase the item.

With the different advantageous embodiments, a user is able to purchase an item in a more efficient manner. The user does not need to call the seller or enter a universal resource locator to find a website for the seller. Further, without the involvement of an operator, less chances for error in the transaction may occur. Further, without requiring a user to enter information into a form on a web page, additional possibilities for error are also omitted. The personal information needed to purchase the item is stored in the television system. This information may be entered by a user and stored. As a result, a user does not have to enter the information each time a purchase is made, reducing the possibility of error on the part of the user. Further, the different illustrative embodiments save time and cost for the seller because the seller does not need to have operators to process orders.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing purchasing items, the computer implemented method comprising:
   receiving a broadcast television signal at a television system, wherein the broadcast television signal contains data indicating that an item in the broadcast television signal is being offered for sale;
   generating, by a purchase process of the television system, a presentation of a visual cue in association with the item being presented in the television system in response to receiving the data indicating that the item in the broadcast television signal is being offered for sale; and
   responsive to receiving an input from a user to purchase the item, sending, by the television system, a purchase request process to a seller of the item to purchase the item using personal information of the user stored in the television system needed to purchase the item.

2. The computer implemented method of claim 1, wherein the sending step comprises:
   identifying the seller offering the item;
   creating, by the television system, a purchase request for the item using the personal information of the user stored in the television system;
   sending the purchase request from the television system to the seller over a communications network;
   receiving a response to the purchase request that includes a marketing incentive to purchase an additional item at a reduced total cost; and
   displaying the response that includes the marketing incentive in the television system with an ability for the user to accept or decline the marketing incentive.

3. The computer implemented method of claim 2, wherein the step of sending the purchase request from the television system to the seller over the communications network comprises:
   sending the purchase request to the seller over a public switched telephone network.

4. The computer implemented method of claim 2, wherein the step of sending the purchase request from the television system to the seller over the communications network comprises:
   sending the purchase request to the seller over an Internet.

5. The computer implemented method of claim 2, wherein the identifying step comprises:
   identifying the seller from one of the data and listing data.

6. The computer implemented method of claim 1, wherein the sending step comprises:
   responsive to receiving the input from the user to purchase the item, sending, by the television system, a purchase request containing the personal information of the user stored in the television system from the television system to a broadcaster of the broadcast television signal over a communications network.

7. The computer implemented method of claim 6, wherein the purchase request includes a time stamp, channel information, and an identifier that identifies the television system that sent the purchase request and further comprising:
   responsive to the input from the user to purchase the item, identifying the seller offering the item based on the time stamp and the channel information in the purchase request.

8. The computer implemented method of claim 1, wherein the item is one of a good and a service.

9. The computer implemented method of claim 1, wherein the television system comprises one of a set-top box, a television, the set-top box and the television, a mobile phone, and a computer.

10. The computer implemented method of claim 1, wherein the personal information comprises a user name, an address, and a credit card number.

11. A computer program product for processing purchasing items, the computer program product comprising:
   a computer readable storage device;
   program code, stored on the computer readable storage device, for receiving a broadcast television signal at a television system, wherein the broadcast television signal contains data indicating that an item in the broadcast television signal is being offered for sale;

program code, stored on the computer readable storage device, for generating, by a purchase process of the television system, a presentation of a visual cue in association with the item being presented in the television system in response to receiving the data indicating that the item in the broadcast television signal is being offered for sale; and program code, stored on the computer readable storage device, responsive to receiving an input from a user to purchase the item, for sending, by the television system, a purchase request process to a seller of the item to purchase the item using personal information of the user stored in the television system needed to purchase the item.

12. The computer program product of claim 11, wherein the program code, stored on the computer readable storage device, responsive to receiving the input from the user to purchase the item, for sending the purchase request process to the seller of the item to purchase the item using the personal information of the user stored in the television system needed to purchase the item comprises:

program code, stored on the computer readable storage device, for identifying the seller offering the item;

program code, stored on the computer readable storage device, for creating, by the television system, a purchase request for the item using the personal information of the user stored in the television system;

program code, stored on the computer readable storage device, for sending the purchase request from the television system to the seller over a communications network;

program code, stored on the computer readable storage device, for receiving a response to the purchase request that includes a marketing incentive to purchase an additional item at a reduced total cost; and program code, stored on the computer readable storage device, for displaying the response that includes the marketing incentive in the television system with an ability for the user to accept or decline the marketing incentive.

13. The computer program product of claim 12, wherein the program code, stored on the computer readable storage device, for sending the purchase request from the television system to the seller over the communications network comprises:

program code, stored on the computer readable storage device, for sending the purchase request to the seller over a public switched telephone network.

14. The computer program product of claim 12, wherein the program code, stored on the computer readable storage device, for sending the purchase request from the television system to the seller over the communications network comprises:

program code, stored on the computer readable storage device, for sending the purchase request to the seller over an Internet.

15. The computer program product of claim 12, wherein the program code, stored on the computer readable storage device, for identifying the seller offering the item comprises:

program code, stored on the computer readable storage device, for identifying the seller from one of the data and listing data.

16. The computer program product of claim 11, wherein the program code, stored on the computer readable storage device, responsive to receiving the input from the user to purchase the item, for sending the purchase request process to the seller of the item to purchase the item using the personal information of the user stored in the television system needed to purchase the item comprises:

program code, stored on the computer readable storage device, responsive to receiving the input from the user to purchase the item, for sending, by the television system, a purchase request containing the personal information of the user stored in the television system from the television system to a broadcaster of the broadcast television signal over a communications network.

17. The computer program product of claim 16, wherein the purchase request includes a time stamp, channel information, and an identifier that identifies the television system that sent the purchase request and further comprising:

program code, stored on the computer readable storage device, responsive to the input from the user to purchase the item, for identifying the seller offering the item based on the time stamp and the channel information in the purchase request.

18. A television system comprising:

a communications unit;

a storage device; wherein the storage device includes computer usable program code; and a processor unit; wherein the processor unit executes the computer usable program code to receive a broadcast television signal through the communication unit in the television system, wherein the broadcast television signal contains data indicating that an item in the broadcast television signal is being offered for sale; generate, by a purchase process of the television system, a presentation of a visual cue in association with the item being presented in the television system in response to receiving the data indicating that the item in the broadcast television signal is being offered for sale; and send, by the television system, a purchase request process to a seller of the item to purchase the item using personal information of a user stored in the television system needed to purchase the item in response to receiving an input from the user to purchase the item.

19. The television system of claim 18, wherein in executing the program code to send the purchase request process to the seller of the item to purchase the item using the personal information of a user stored in the television system needed to purchase the item in response to receiving the input from the user to purchase the item, the processor executes the program code to identify the seller offering the item; create, by the television system, a purchase request for the item using the personal information of the user stored in the television system; send the purchase request from the television system to the seller over a communications network; receive a response to the purchase request that includes a marketing incentive to purchase an additional item at a reduced total cost; and display the response that includes the marketing incentive in the television system with an ability for the user to accept or decline the marketing incentive.

20. The television system of claim 19, wherein in executing the program code to send the purchase request from the television system to the seller over the communications network, the processor executes the program code to send the purchase request to the seller over a public switched telephone network.

* * * * *